US005288001A

United States Patent [19]

Locarno

[11] Patent Number: 5,288,001

[45] Date of Patent: Feb. 22, 1994

[54] OXYGEN TANK HOLDER FOR USE WITH WHEELCHAIRS

[75] Inventor: Michael M. Locarno, Boonton, N.J.

[73] Assignee: Bel-Art Products, Inc., Pequannock, N.J.

[21] Appl. No.: 72,056

[22] Filed: Jun. 7, 1993

[51] Int. Cl.[5] .............. B60R 9/06

[52] U.S. Cl. .............. 224/42.46 R; 224/273; 280/304.1; 297/191

[58] Field of Search ........ 224/273, 275, 148, 42.46 R; 297/191, 188, DIG. 4; 136/66; 128/204.18, 205.26, 200.24; 280/304.1

[56] References Cited

U.S. PATENT DOCUMENTS

| | | | |
|---|---|---|---|
| 3,970,344 | 7/1976 | Baumann | 297/189 |
| 4,213,648 | 7/1980 | Steichen | 297/188 |
| 4,431,206 | 2/1984 | Pryor | 280/289 WC |
| 4,466,659 | 8/1984 | Carpentier et al. | 297/191 |
| 4,506,903 | 3/1985 | Bowermaster | 280/289 WC |
| 4,577,903 | 3/1986 | Wells | 297/191 |
| 4,696,420 | 9/1987 | Kulik | 224/275 |
| 4,861,059 | 8/1989 | Shirk | 297/DIG. 4 X |
| 5,226,576 | 7/1993 | Ellsworth | 224/275 X |

*Primary Examiner*—Glenn T. Barrett

*Attorney, Agent, or Firm*—Anthony F. Cuoco

[57] ABSTRACT

An oxygen tank holder of a suitable fabric material includes a pouch for holding an oxygen tank, and which pouch is strapped at its upper and lower ends to the back of a wheelchair. The straps are adjustable to accommodate various size wheelchairs and so that the pouch can be displaced away from the center of the wheelchair to avoid interfering with the back of the user of the chair, as is desireable.

6 Claims, 2 Drawing Sheets

OXYGEN TANK HOLDER FOR USE WITH WHEELCHAIRS

BACKGROUND OF THE INVENTION

This invention relates to an oxygen tank holder for use with wheelchairs and, more particularly, to an oxygen tank holder of the type described which is of a suitable fabric material so as to be collapsible and which is supported by the wheelchair handle supports and the bottom frame of the chair.

Patients suffering from respiratory ailments are often wheelchair bound for mobility purposes and must have oxygen readily available. It is thus imperative that an oxygen tank be coupled to the wheelchair so as to be moveable therewith.

The present inventor is aware of the following prior art of interest: U.S. Pat. No. 4,213,648 (U.S. Class 297/188) issued to Steichen on Jul. 22, 1980; U.S. Pat. No. 4,506,903 (U.S. Class 280/289) issued to Bowermaster on Mar. 26, 1985; U.S. Pat. No. 4,696,420 (U.S. Class 224/275) issued to Kulic on Sep. 29, 1987; U.S. Pat. No. 4,431,206 (U.S. Class 280/289) issued to Pryor on Feb. 14, 1984; and U.S. Pat. No. 3,970,344 (U.S. Class 297/189) issued to Baumann on Jul. 20, 1976.

U.S. Pat. No. 4,213,648 relates to a wheelchair having a rigid support frame for supporting an oxygen tank thereon. The support frame includes a holding device having a hollow cylinder with an open top end and a bottom closed end. The cylinder includes a mounting bracket for releasably attaching the cylinder to the spaced upwardly extending pins on the wheelchair frame conventionally used to mount detachable foot rests.

U.S. Pat. No. 4,506,903 relates to a device for detachably coupling a wheelchair oxygen tank cart to a wheelchair such that the cart and the chair are transportable together as a unit without the need of a separate operator for the cart.

U.S. Pat. No. 4,696,420 relates to a device for detachably coupling a rigid oxygen tank carrier to a wheelchair, wherein the device fits between the downwardly directed support arms of the chair with the carrier being made in different lengths, depending on the size of the chair.

U.S. Pat. No. 4,431,206 teaches an accessory carrier for oxygen bottles, intravenous containers and other medical accessories and to this extent includes a lower vertically extending post for detachable attachment to the back of the wheelchair so as to permit folding of the chair and further including an upper elongated vertical post for supporting additional accessories.

U.S. Pat. No. 3,970,344 teaches an oxygen tank holding device for ready attachment to a wheelchair. The device is collapsible to the extent that it includes a tank receiving basket and a pair of struts detachably supported on the wheelchair and pivotally connected to the sides of the basket. Flexible cable means are provided to maintain the basket in a vertical position when the device is in an operative position on the wheelchair.

The device of the present invention features a fabric pouch for holding an oxygen tank, and which pouch is strapped at its top and bottom to the back of a wheelchair. Accordingly, the present invention differs structurally from the prior art as aforenoted.

SUMMARY OF THE INVENTION

This invention contemplates an oxygen tank holder for use with wheelchairs including a pouch of a suitable flexible fabric material within which an oxygen tank is disposed. Fabric straps extend in opposite directions from the opposite sides of the pouch near the open top thereof and fabric loops extend in opposite directions from the opposite sides of the pouch near the closed bottom thereof. The straps engage the wheelchair handle supports and the loops engage the bottom frame of the chair, whereby the oxygen tank holder is supported on the back of the chair. The straps are adjustable and the loops are of different sizes, whereby different size wheelchairs may be accommodated and the pouch may be supported away from the center of the wheelchair back so as not to interfere with the back of a patient using the wheelchair, as might otherwise be the case.

DETAILED DESCRIPTION OF THE INVENTION

Figure 1:
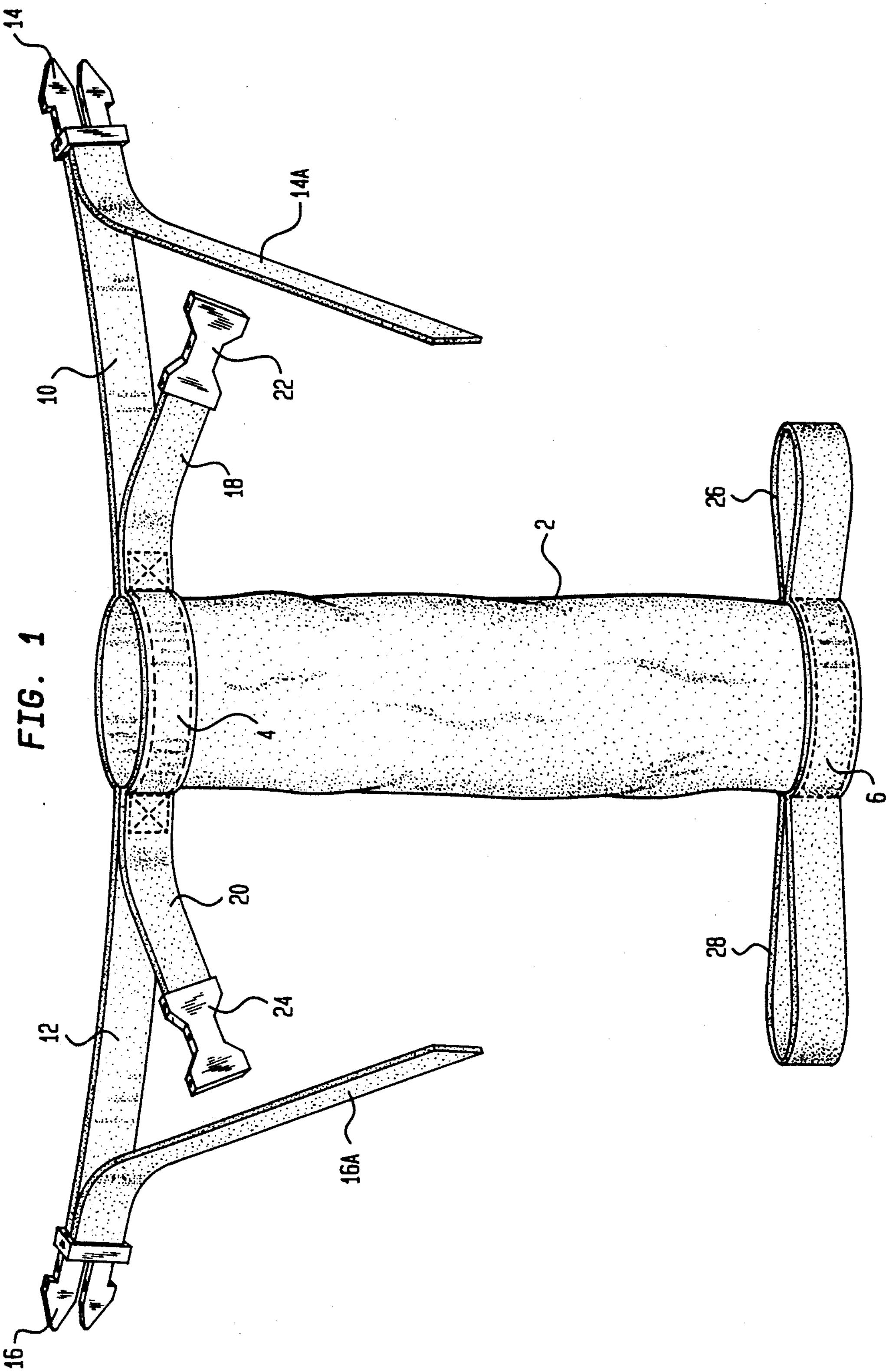
FIG. 1 is a plan view representation illustrating an oxygen tank holder in accordance with the invention.
Figure 2:
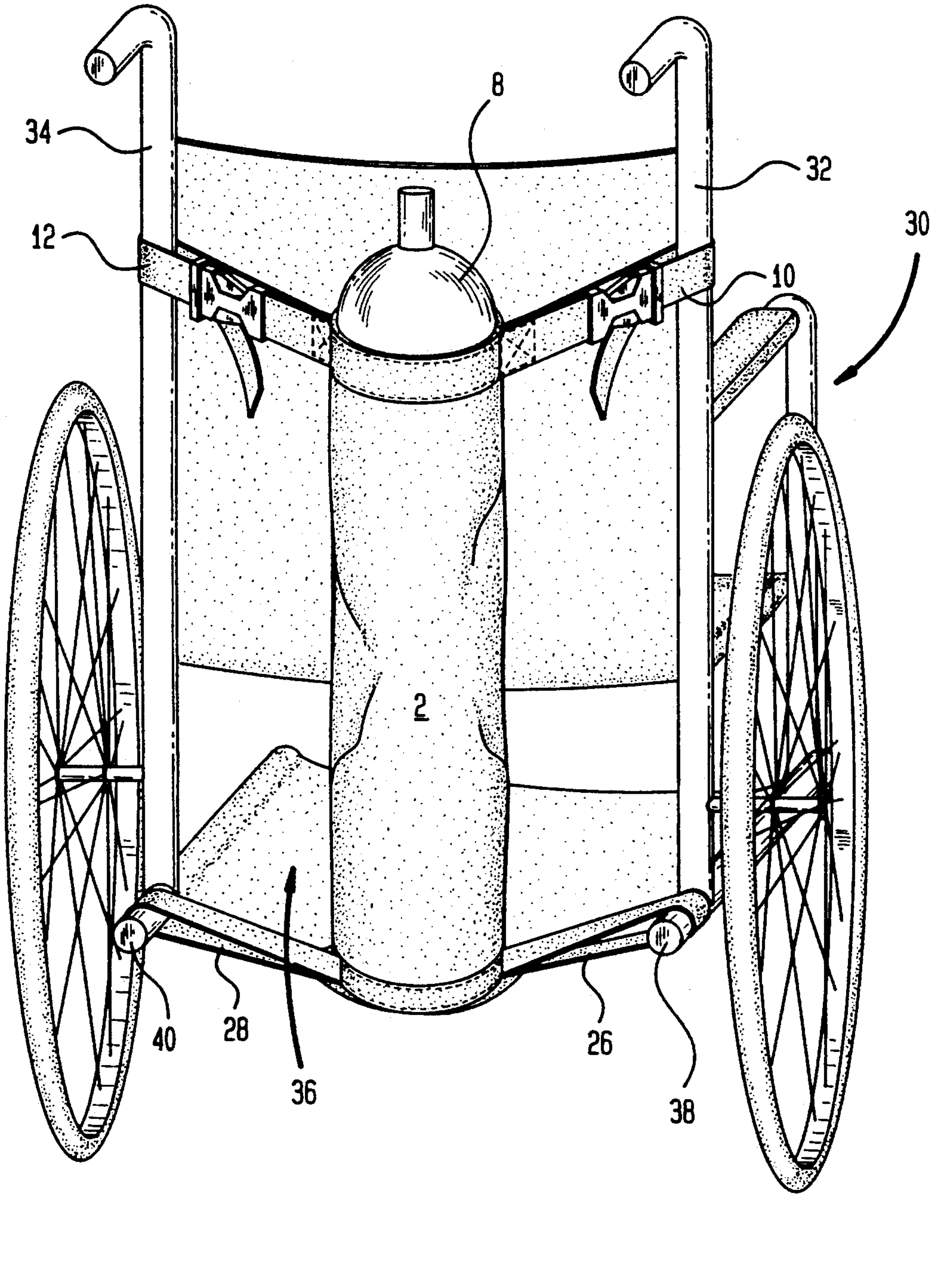
FIG. 2 is a diagrammatic representation illustrating the oxygen tank holder shown in FIG. 1 supported on the back of a wheelchair.

With reference first to FIG. 1, a pouch is designated by the numeral 2. Pouch 2 includes an open top 4 and a closed bottom 6. An oxygen tank 8 shown in FIG. 2 is disposed within pouch 4 so as to be carried thereby.

A strap 10 is secured to pouch 2 near open top 4 thereof so as to extend away therefrom in one direction and a strap 12 is secured to the top of pouch 2 near open top 4 thereof so as to extend away therefrom in an opposite direction. Straps 10 and 12 include buckle members 14 and 16, respectively, and are adjustable with respect to the buckle members, as indicated by strap tails 14A and 16A, respectively, whereby the length of the straps can be adjusted.

A tail 18 is secured to pouch 2 near open top 4 thereof so as to extend away therefrom generally in the direction of strap 10 and a tail 20 is secured to pouch 2 near open top 4 thereof so as to extend away therefrom generally in the direction of strap 12. Tails 18 and 20 include buckle members 22 and 24, respectively. The arrangement is such that buckle member 14 engages buckle member 22 and buckle member 16 engages buckle member 24 when pouch 2 is supported on a wheelchair, as will be further described with reference to FIG. 2.

A loop 26 is secured to pouch 2 near closed bottom 6 thereof and extends generally in the direction of strap 10. A loop 28 is secured to pouch 2 near closed bottom 6 thereof and extends generally in the direction of strap 12. One of the loops such as 28 is longer than the other of the loops for purposes as will hereinafter become evident. Loops 26 and 28 engage the bottom frame of the wheelchair when pouch 2 is supported thereon, as will be described with reference to FIG. 2.

With particular reference now to FIG. 2, a conventional type wheelchair is designated generally by the numeral 30. Wheelchair 30 has a pair of transversely spaced handle supports 32 and 34 extending longitudinally along the back of the wheelchair, and has a bottom frame 36 having rearwardly extending transversely spaced bar members 38 and 40. Since wheelchair 30 is of the conventional type as aforenoted, only as much of the wheelchair as is necessary to understand the invention will be described herein.

In supporting pouch 2 on the back of wheelchair 30, strap 10 is disposed around handle support 32 near the top thereof and buckled to tail 18 via buckle members 14 and 22 (FIG. 1). Likewise, strap 12 is disposed around handle support 32 near the top thereof and is buckled to tail 20 via buckle members 16 and 24 (FIG. 1). Loop 26 is looped over bottom frame bar member 38 and loop 28 is looped over bottom frame bar member 40.

The adjustability of straps 10 and 12 and the difference in the lengths of loops 26 and 28 is an important feature of the invention. Thus, straps 10 or 12 can be lengthened or shortened in their respective buckle members 14 or 16, as the case may be, so that the top 4 of pouch 2 is displaced in one or an opposite direction from the center of the back of wheelchair 30. The difference in the lengths of loops 26 and 28 serves to align bottom 6 of pouch 2 with top 4 thereof so displaced, as aforenoted. Thus, with the arrangement described, pouch 2, shown in FIG. 2 as centered on the back of wheelchair 30, can be displaced to accommodate different transverse spacing between handle supports 32 and 34 and bottom frame bar members 38 and 40, and can be displaced away from the center of the back of the wheelchair so as not to interfere with the back of a user of the chair, as may be uncomfortable and otherwise undesirable for said user.

The invention as described herein has several advantages over prior art oxygen tank holders for use with wheelchairs, as will be readily discerned. For example, the oxygen tank holder of the invention is not rigid and is thus lighter in weight than prior art oxygen tank holders so as to be particularly useful by the disabled. In this regard, it will be understood that pouch 2 and the several straps and tails heretofore described are formed from a suitable flexible fabric material such as a heavy duty waterproof Nylon. This avoids rigid metallic holders, struts, brackets and the like for supporting the oxygen tank holder on the wheelchair, as has otherwise been necessary. Further, the present device can be easily removed from the wheelchair and compactly folded and stored or packed when not in use. The device of the invention may be easily fabricated as by sewing or the like as will be readily understood.

With the above description of the invention in mind, reference is made to the claims appended hereto for a definition of the scope of the invention.

What is claimed is:

1. An oxygen tank holder for use with wheelchairs, comprising:

a pouch having an open top and a closed bottom for holding an oxygen tank;

first strap means adapted to be disposed around a first wheelchair handle support secured to the pouch near the open top thereof and extending away therefrom in one direction;

second strap means adapted to be disposed around a second wheelchair handle support secured to the pouch near the open top thereof and extending away therefrom in a direction opposite the one direction;

first loop means adapted to be looped around a first bottom wheelchair frame member secured to the pouch near the closed bottom thereof and extending away therefrom generally in the direction of the first strap means;

second loop means adapted to be looped around a second bottom wheelchair frame member secured to the pouch near the closed bottom thereof and extending away therefrom generally in the direction of the second strap means;

the first strap means adapted to be disposed around the first wheelchair handle support near a top of said first support;

the second strap means adapted to be disposed around the second wheelchair handle support near a top of said second support;

said first and second wheelchair handle supports extending longitudinally along a back of the wheelchair in transversely spaced relation;

the first loop means adapted to be looped around the first bottom wheelchair frame member;

the second loop means adapted to be looped around the second bottom wheelchair frame member;

said first and second bottom wheelchair frame members extending rearwardly of the wheelchair in transversely spaced relation;

said first and second strap means and said first and second loop means cooperatively arranged on the respective first and second wheelchair handle support members and the respective first and second bottom wheelchair frame members for supporting the pouch on the back of the wheelchair so that the open top of the pouch is in alignment with the closed bottom thereof; and the first and second strap means having lengths which are adjustable and a length of one of the first and second loop means being longer than a length of the other of said first and second loop means, whereby said first and second strap means and said first and second loop means are cooperatively arranged on the respective wheelchair handle support members and the respective bottom wheelchair frame members to accommodate different transverse spacing between the handle support members and the bottom frame members, and so that the pouch can be displaced away from a center of the wheelchair back with the alignment of the open pouch top and the closed pouch bottom being maintained.

2. An oxygen tank holder as described by claim 1, wherein each of the first and second strap means includes:

a first strap member and a first buckle member associated therewith, said first strap member being adjustable in length on said first buckle member;

a tail having a second buckle member attached thereto; and said first and second buckle members being in engaged relation when the strap means is disposed around a respective handle support.

3. An oxygen tank holder as described by claim 1, wherein:

the pouch, the first and second strap means and the first and second loop means are of a flexible fabric material to facilitate folding the pouch for storage and packing when not in use.

4. For use with a wheelchair of the type having a pair of handle supports extending longitudinally along the back of the wheelchair in transversely spaced relation and a pair of bottom frame members extending rearwardly of the wheelchair in transversely spaced relation, an oxygen tank holder comprising:

a pouch having an open top and a closed bottom for holding an oxygen tank;

first strap means adapted to be disposed around one of the pair of wheelchair handle supports secured to the pouch near the open top thereof and extending away therefrom in one direction;

second strap means adapted to be disposed around the other of the pair of wheelchair handle supports secured to the pouch near the open top thereof and extending away therefrom in a direction opposite the one direction;

first loop means adapted to be looped around one of the pair of bottom wheelchair frame members secured to the pouch near the closed bottom thereof and extending away therefrom generally in the direction of the first strap means;

second loop means adapted to be looped around the other of the pair of bottom wheelchair frame members secured to the pouch near the closed bottom thereof and extending away therefrom generally in the direction of the second strap means;

the first strap means adapted to be disposed around the one of the pair of wheelchair handle supports near a top of said one support;

the second strap means adapted to be disposed around the other of the pair of wheelchair handle supports near a top of said other support;

a first loop means adapted to be looped around the one of the pair of bottom wheelchair frame members;

the second loop means adapted to be looped around the other of the pair of bottom wheelchair frame members;

said first and second strap means and said first and second loop means cooperatively arranged on the respective first and second wheelchair handle support members and the respective first and second bottom wheelchair frame members for supporting the pouch on a back of the wheelchair so that the open top of the pouch is in alignment with the closed bottom thereof; and the first and second strap means having lengths which are adjustable and a length of one of the first and second loop means being longer than a length of the other of said first and second loop means, whereby said first and second strap means and said first and second loop means are cooperatively arranged on the respective wheelchair handle support members and the respective bottom wheelchair frame members to accommodate different transverse spacing between the handle support members and the bottom frame members, and so that the pouch can be displaced away from a center of the wheelchair back with the alignment of the open pouch top and the closed pouch bottom being maintained.

5. An oxygen tank holder as described by claim 4, wherein each of the first and second strap means includes:

a first strap member and a first buckle member associated therewith, said first strap member being adjustable in length on said first buckle member;

a tail having a second buckle member attached thereto; and said first and second buckle members being in engaged relation when the strap means is disposed around a respective handle support.

6. An oxygen tank holder as described by claim 4, wherein:

the pouch, the first and second strap means and the first and second loop means are of a flexible fabric material to facilitate folding the pouch for storage and packing when not in use.

* * * * *